June 2, 1970    R. A. F. WESTERGREN    3,514,810
DEVICE FOR SUSPENDING OR CARRYING PIECES OF SOFT
MATERIAL, ESPECIALLY CUT UP MEAT OR PORK OR
SIMILAR FOOD STUFFS
Filed April 3, 1967    2 Sheets-Sheet 1
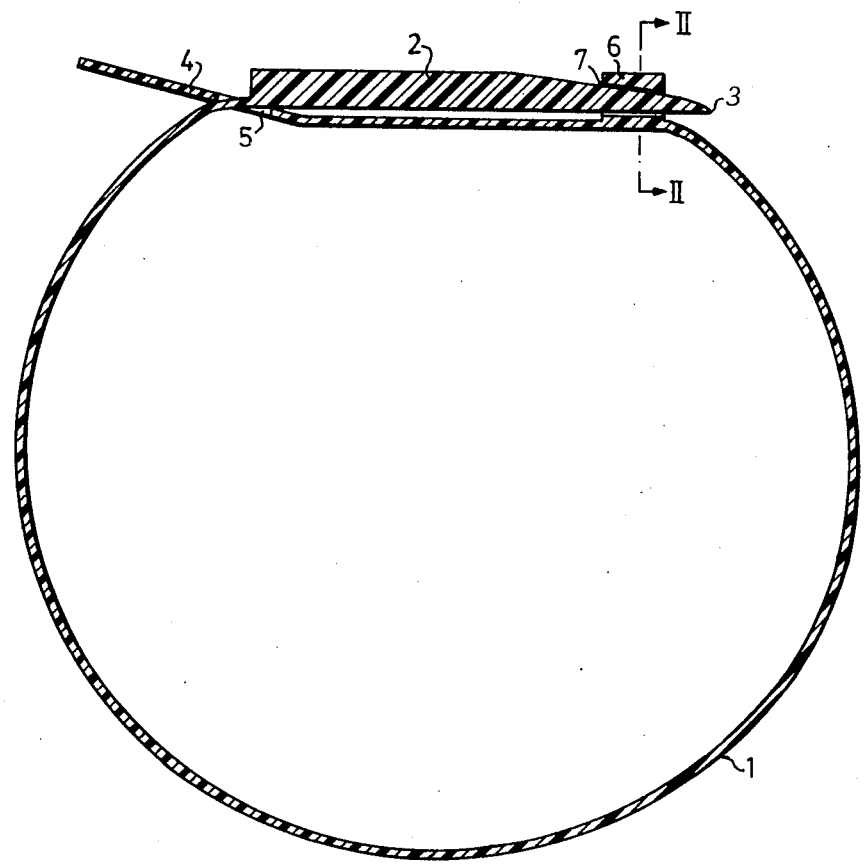
INVENTOR.
ROLF ALBERT FREDRIK WESTERGREN
BY
Young + Thompson
ATTYS.

United States Patent Office 3,514,810
Patented June 2, 1970

3,514,810
DEVICE FOR SUSPENDING OR CARRYING PIECES OF SOFT MATERIAL, ESPECIALLY CUT UP MEAT OR PORK OR SIMILAR FOODSTUFFS
Rolf Albert Fredrik Westergren, Saltsjo-Duvnas, Sweden, assignor to Bengt Gunnar Tornqvist, Nasby, Sweden
Filed Apr. 3, 1967, Ser. No. 627,736
Claims priority, application Sweden, Apr. 4, 1966, 4,514/66
Int. Cl. A22c 15/00
U.S. Cl. 17—44.2
6 Claims

ABSTRACT OF THE DISCLOSURE

The invention concerns a device for one time use by means of which cuts of meat or the like can be suspended or carried in a hygienic manner. Said device consists of a strip or string of flexible material one end of which comprises a stiff and pointed portion. Said stiff and pointed portion is meant to be forced through a part of a cut of meat, whereafter the ends of said string or strip are brought together and joined so that the strip or string forms a loop in which the cut of meat can be suspended or carried.

---

Figure 3:
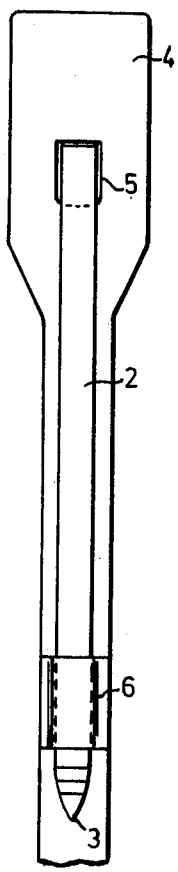

The present invention concerns a device for suspending or carrying pieces of soft material, especially cut up meat or pork or similar foodstuffs.

During the treatment of meat and pork or the like in the food industry each cut of meat or pork is repeatedly suspended on sharp hooks both in the slaughter house, the transport vehicles and in butcher's shops. The cleanliness of said hooks must thereby be very high so that the meat does not become infected and damaged from within at the locations where said hooks have penetrated. Furthermore, the cuts of meat are subjected to mechanical damage when the hooks penetrate same at different points. The handling of the meat by the butcher will also affect it as it is often pressed against the butcher's chest and a daily change of the protective coat or the like is not sufficient to remove all risks of infection.

The purpose of the present invention is to remove said disadvantages and to provide a device by means of which pieces of meat can be suspended without the need of hooks penetrating said pieces and also carried so that the pieces of meat do not come into contact with the butcher.

According to the invention said purpose is mainly achieved by means of a strip or string of flexible material preferably plastic, one end of said strip or string being provided with or formed as a rigid portion having a sharp pointed end and being connectible with the other end of said strip or string when same has been bent to a loop. When using the device according to the invention said rigid portion is pushed through the piece of meat, said pointed end thereby facilitating the penetration of said portion. The strip or string is thereafter pulled into said piece of meat and bent into a loop and said rigid portion thereof is connected with the opposite end of the strip or string. A part of the loop formed by the strip or string will thus be situated outside of the piece of meat and the meat can be carried or suspended on a hook by means of said part.

Two embodiments of the device according to the invention will now be described in detail with reference to the attached drawing, in which FIG. 1 shows one embodiment of the object of the invention in section; FIG. 2 is a section on line II—II in FIG. 1 and shows a modified embodiment; and FIG. 3 is a plan view of the embodiment of FIG. 1.

The device according to the invention comprises an elongated flexible member in the form of a strip or string 1, preferably of plastic. The strip is flexible so that the ends thereof can be joined, whereby the strip forms a loop, and the strength of the strip or string is sufficient to carry the piece of meat in question.

At one end of its ends said strip is provided with or formed as a rigid portion 2 having a sharp point 3. Said rigid portion 2 has such a length and thickness that it can be forced through the meat to be suspended or carried without bending. Thus, said rigid and pointed portion of the strip facilitates the pulling of the strip or string 1 through the piece of meat.

At the opposite end the strip 1 is provided with a wider portion 4 having a hole 5 through which said rigid portion 2 is insertable when said strip is bent into a loop. The rigid portion 2 shall thereby be pulled completely through the hole 5 so that the strip itself enters into same.

At a certain distance from said hole somewhat less than the length of said rigid portion 2 the strip is provided with a locking device.

In the embodiment shown in FIG. 1 said locking device is formed as a block 6 having a through bore 7 extending longitudinally of the strip and having a diameter sufficient to receive the point 3 of said rigid portion 2. When the ends of the strip according to this embodiment shall be joined to each other the portion 2 and such a length of the strip 1 are pulled through said hole 5 that the point 3 can be inserted into the bore 7 of the block 6. The length of the strip pulled through the hole is thereafter retracted from said hole 5 whereby a safe locking of the rigid portion 2 to the opposite end of the strip is obtained, since displacement of said portion longitudinally of said strip in one direction is prevented by said block 6 and in the opposite direction by a shoulder between the strip 1 and the rigid portion 2. For further improvement of the security of the locking the free end of said rigid portion 2 can be provided with barbs which renders the retraction of the point 3 from the bore 7 more difficult.

The embodiment shown in FIG. 2 corresponds fully with the above described embodiment with the exception that the block 6 is provided with a slot 8 longitudinally of the strip 1, which extends from the top surface of the block 6 down to the through bore 7. The block 6 thus forms two parallel parts or jaws situated opposite each other, which are bent outwards when the end of the rigid portion 2 is forced down into the slot 8 and snaps back over said end, when same reaches the bore 7. When the loop is to be closed by this embodiment no part of the strip 1 has to be pulled through the hole 5, but as soon as the rigid portion has been pushed through said hole the end 3 of the rigid portion can be pressed down through said slot 8 into locking position in the bore 7.

The broader portion 4 of said strip 1 preferably reaches a distance past the hole 5 and can be used for different markings, viz. with a registered trademark for the meat, the quality of the meat, the price thereof etc. Said markings can be made either upon manufacture of the device or later.

The parts comprised in the device are preferably given such a form, i.e. with regard to the section form of the strip 1 and the rigid portion 2, that the device is easy to manufacture and the rigid portion easily can be forced through the meat. The material used for the manufacture of the strip 1 and the rigid portion 2 ought furthermore to be of such a nature as not to be affected during the treatment the suspended piece of meat undergoes, i.e. salting, smoking, freezing, etc. The device according to the invention is preferably in sterile condition packed in a sterile package, for instance consisting of plastic foil, and a number of devices can be arranged longitudinally after each other or side by side in the same package.

The range of application of the device according to the invention is naturally not limited to the one stated in the

What I claim is:

1. A device for providing a suspension loop for a piece of material, especially cuts of meat, pork, and similar foodstuffs, said device comprising an elongated member of flexible material, one end of said member having an opening therethrough, and an elongated rigid pointed spike integral with the other end of said member, said opening being of a size to permit said spike to pass therethrough, the cross section of said spike at least in one direction being greater than the corresponding cross section of said member to form a shoulder at the end of said spike which is opposite the point of the spike, said spike being insertable through said piece of material to be suspended and thereafter through said opening until said shoulder passes through said opening, and means on said one end of said member spaced from said opening in the direction of said other end having a recess to receive the pointed end of the spike and to prevent the pointed end of the spike from traveling farther in the direction of the point, so that when the spike is inserted through said opening into engagement with said receiving means, a suspension loop is formed and said spike is held substantially immobile superposed along said one end of said member by engagement of the pointed end of the spike with receiving means in one direction and by interference between said shoulder and an edge of said opening in the other direction.

2. A device as claimed in claim 1, in which the distance between said opening and said recessed means is somewhat less than the length of said spike.

3. A device as claimed in claim 1, said recessed means comprising a block on said member having a bore extending longitudinally of said member through said block.

4. A device as claimed in claim 3, in which said point is provided with barbs.

5. A device as claimed in claim 3, in which said block has a slot extending longitudinally of the member and extending from the top surface of the block to the through bore therein.

6. A device as claimed in claim 1, the end of said member surrounding said opening being broader than the rest of the member and the rigid spike.

References Cited

UNITED STATES PATENTS

| | | | |
|---|---|---|---|
| 3,072,986 | 1/1963 | Lefnaer | 24—16 |
| 3,086,265 | 4/1963 | Orenick et al. | 24—30.5 |
| 3,147,522 | 9/1964 | Schumm | 24—16 |
| 3,214,808 | 11/1965 | Litwin | 24—16 |
| 3,362,411 | 1/1968 | Moller | 24—16 X |

LUCIE H. LAUDENSLAGER, Primary Examiner

U.S. Cl. X.R.

24—16